United States Patent
Zhou et al.

(10) Patent No.: US 8,469,383 B2
(45) Date of Patent: Jun. 25, 2013

(54) MIDWHEEL DRIVE WHEELCHAIR WITH INDEPENDENT FRONT AND REAR SUSPENSION

(75) Inventors: Daniel Z. Zhou, Fresno, CA (US); Mark A. Jackson, Fresno, CA (US); John J. Tarter, Fresno, CA (US); Mark E. Greig, Longmont, CO (US); Rex W. Stevens, Longmont, CO (US); James M. Koerlin, Broomfield, CO (US); Samuel D. Traxinger, Fresno, CA (US); Allen B. Killebrew, Longmont, CO (US)

(73) Assignee: Sunrise Medical (US) LLC, Fresno, CA (US)

( * ) Notice: Subject to any disclaimer, the term of this patent is extended or adjusted under 35 U.S.C. 154(b) by 0 days.

(21) Appl. No.: 13/541,054

(22) Filed: Jul. 3, 2012

(65) Prior Publication Data

US 2012/0273283 A1    Nov. 1, 2012

Related U.S. Application Data (63) Continuation of application No. 13/372,278, filed on Feb. 13, 2012, now Pat. No. 8,210,556, which is a continuation of application No. 12/333,102, filed on Dec. 11, 2008, now Pat. No. 8,113,531, which is a continuation-in-part of application No. 11/504,968, filed on Aug. 16, 2006, now Pat. No. 7,896,394.

(60) Provisional application No. 60/799,529, filed on May 11, 2006, provisional application No. 60/709,307, filed on Aug. 18, 2005, provisional application No. 60/007,137, filed on Dec. 11, 2007.

(51) Int. Cl.
*B62D 61/12*    (2006.01)

(52) U.S. Cl.
USPC ............... 280/304.1; 280/250.1; 180/209; 180/907

(58) Field of Classification Search
USPC ............... 280/124, 128, 47.38, 250.1, 755, 280/164, 767, 124.1, 4.07, 59, 60, 124.04, 280/754, 118; 180/65.1, 209, 24.07, 59, 907; 297/DIG. 4
See application file for complete search history.

(56) References Cited

U.S. PATENT DOCUMENTS

| | | | | |
|---|---|---|---|---|
| 6,851,711 B2 * | 2/2005 | Goertzen et al. | ............... | 280/755 |
| 7,066,290 B2 * | 6/2006 | Fought | ................. | 180/65.51 |
| 7,293,801 B2 * | 11/2007 | Bertrand et al. | ............... | 280/755 |
| 7,413,038 B2 * | 8/2008 | Mulhern et al. | ................ | 180/22 |
| 7,506,709 B2 * | 3/2009 | Kiwak et al. | ................. | 180/65.1 |
| 7,828,310 B2 * | 11/2010 | Vreeswijk et al. | ......... | 280/250.1 |
| 7,942,445 B2 * | 5/2011 | Kramer et al. | ................ | 280/755 |

(Continued)

*Primary Examiner* — John Walters
*Assistant Examiner* — James Triggs
(74) *Attorney, Agent, or Firm* — MacMillan, Sobanski & Todd, LLC (57) ABSTRACT

A wheelchair includes a frame, and a front pivot arm pivotally mounted to the frame at a front pivot point, the front pivot arm having a caster for supporting the frame. A rear pivot arm is pivotally mounted to the frame at a rear pivot point, the rear pivot arm having a caster for supporting the frame. A ground engaging mid-wheel drive wheel is connected to the frame. A linkage connects the front and rear pivot arms to each other in a manner such that an upward or downward rotation of one of the pivot arms about its pivot point causes rotation of the other pivot arm about its pivot point in an opposite rotational direction.

15 Claims, 10 Drawing Sheets

U.S. PATENT DOCUMENTS

2004/0004342 A1* 1/2004 Mulhern et al. ........... 280/304.1
2004/0032119 A1* 2/2004 Tran et al. ..................... 280/755
2004/0150204 A1* 8/2004 Goertzen et al. .............. 280/755
2004/0262859 A1* 12/2004 Turturiello et al. ........ 280/5.515

* cited by examiner

MIDWHEEL DRIVE WHEELCHAIR WITH INDEPENDENT FRONT AND REAR SUSPENSION

CROSS-REFERENCE TO RELATED APPLICATIONS

This application is a Continuation Application of U.S. patent application Ser. No. 13/372,278, filed Feb. 13, 2012, now U.S. Pat. No. 8,210,556, issued Jul. 3, 2012 and entitled MIDWHEEL DRIVE WHEELCHAIR WITH INDEPENDENT FRONT AND REAR SUSPENSION, which is a Continuation Application of U.S. patent application Ser. No. 12/333,102, filed Dec. 11, 2008, now U.S. Pat. No. 8,113,531, issued Feb. 14, 2012 and entitled PERSONAL MOBILITY VEHICLE HAVING A PIVOTING SUSPENSION WITH A TORQUE ACTIVATED RELEASE MECHANISM, which is a Continuation-In-Part Application of U.S. patent application Ser. No. 11/504,968, filed Aug. 16, 2006, now U.S. Pat. No. 7,896,394, issued Mar. 1, 2011 and entitled MIDWHEEL DRIVE WHEELCHAIR WITH INDEPENDENT FRONT AND REAR SUSPENSION, which claimed priority from U.S. Provisional Patent Application Ser. No. 60/709,307, filed Aug. 18, 2005, entitled MIDWHEEL DRIVE WHEELCHAIR WITH INDEPENDENT FRONT AND REAR SUSPENSION, and also from U.S. Provisional Patent Application Ser. No. 60/799,529, filed May 11, 2006, entitled MIDWHEEL DRIVE WHEELCHAIR WITH INDEPENDENT FRONT AND REAR SUSPENSION; and also claims the benefit of U.S. Provisional Application No. 61/007,137, filed Dec. 11, 2007.

TECHNICAL FIELD

This invention relates to suspension systems for personal mobility vehicles, such as wheelchairs.

BACKGROUND OF THE INVENTION

A power wheelchair typically consists of two drives with drive wheels, aligned along a horizontal axis, normal to the direction of forward motion. The drives are attached to a frame structure. Also supporting the frame is typically a single or plurality of idler wheels or caster wheels. Also attached to the frame is a seat. A power source, typically batteries, supplies the electrical energy used to propel the drives. The batteries are typically located within the frame.

Some power wheelchairs are configured with the drive wheels centrally located about the longitudinal axis of the power wheelchair. Such wheelchairs are referred to as a mid-wheel drive wheelchairs or a center-drive wheelchairs. Center-drive wheelchairs are beneficial to the rider in that they have superior maneuverability when compared with power wheelchairs configured with either front or rear wheel drive systems. Stabilization of such wheelchairs usually requires the use of an augmentative system such as caster or idler wheels. Stabilization casters or idler wheels prevent unwanted tipping about the power wheelchair's pitch axis, in either the forward or rearward direction. On a center-drive power wheelchair, these caster or idler wheels are typically found both in front of, and behind the drive wheels. It would be advantageous if there could be developed an improved mid-wheel drive wheelchair whereby the chair is both maneuverable and able to ascend and descend obstacles typically encountered when driving.

SUMMARY OF THE INVENTION

A wheelchair includes a frame, and a front pivot arm pivotally mounted to the frame at a front pivot point, the front pivot arm having a caster for supporting the frame. A rear pivot arm is pivotally mounted to the frame at a rear pivot point, the rear pivot arm having a caster for supporting the frame. A ground engaging mid-wheel drive wheel is connected to the frame. A linkage connects the front and rear pivot arms to each other in a manner such that an upward or downward rotation of one of the pivot arms about its pivot point causes rotation of the other pivot arm about its pivot point in an opposite rotational direction.

According to this invention there is also provided a wheelchair having a frame, a ground engaging mid-wheel drive wheel connected to the frame, and a front pivot arm pivotally mounted to the frame at a front pivot point, the front pivot arm having a caster for supporting the frame, the front pivot arm being independent of the drive wheel. A rear pivot arm is pivotally mounted to the frame at a rear pivot point, the rear pivot arm having a caster for supporting the frame, the rear pivot arm being independent of the drive wheel. A linkage connects the front and rear pivot arms to each other in a manner such that an upward or downward rotation of one of the pivot arms about its pivot point causes rotation of the other pivot arm about its pivot point in an opposite rotational direction.

According to this invention there is also provided a wheelchair that has a frame, a front pivot arm pivotally mounted to the frame at a front pivot point, the front pivot arm having a caster for supporting the frame, and a rear pivot arm pivotally mounted to the frame at a rear pivot point, the rear pivot arm having a caster for supporting the frame. A ground engaging mid-wheel drive wheel is connected to the frame. The front and rear pivot arms are configured in a manner such that an upward or downward rotation of one of the pivot arms about its pivot point causes rotation of the other pivot arm about its pivot point in an opposite rotational direction.

Various objects and advantages of this invention will become apparent to those skilled in the art from the following detailed description of the preferred embodiment, when read in light of the accompanying drawings.

DETAILED DESCRIPTION OF THE INVENTION

Figure 1:
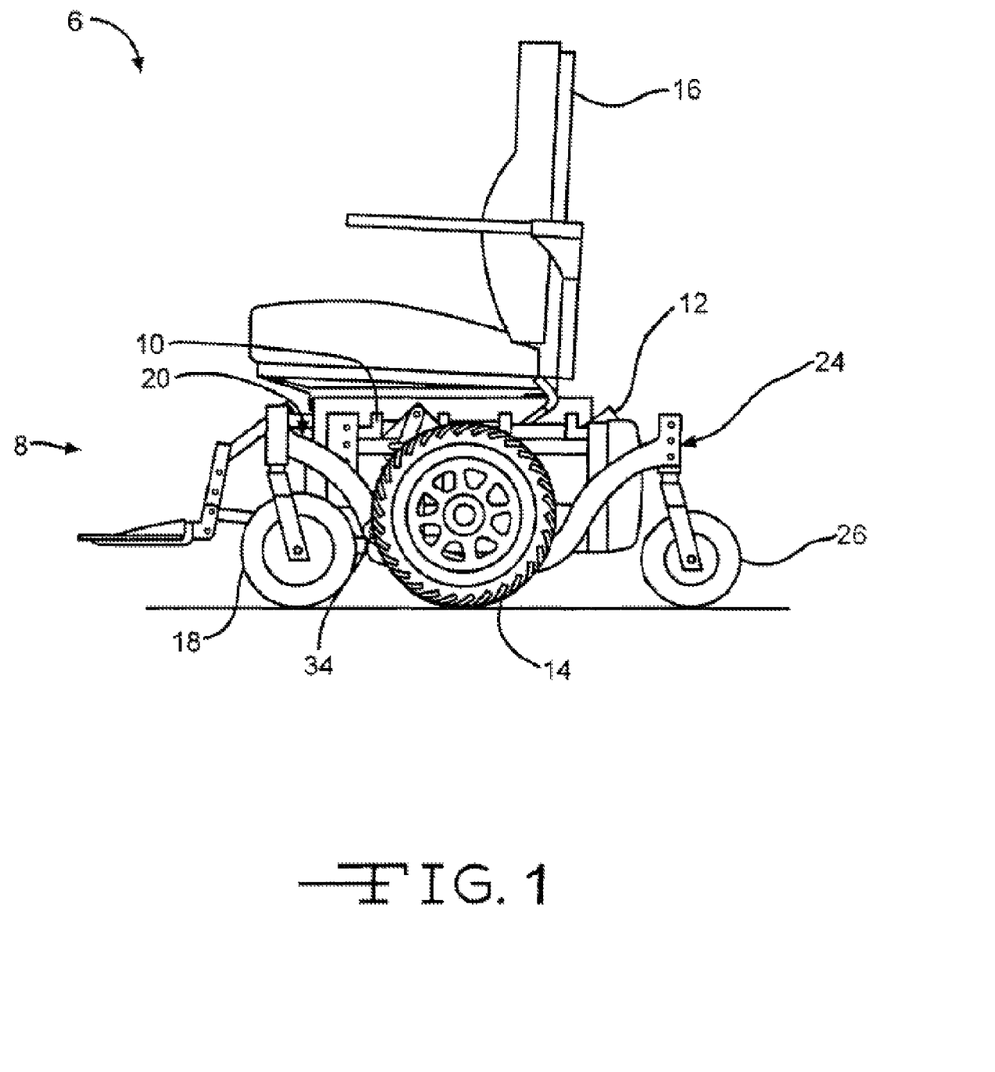
FIG. 1 is a side view in elevation of a center wheel drive power wheelchair.
Figure 2:
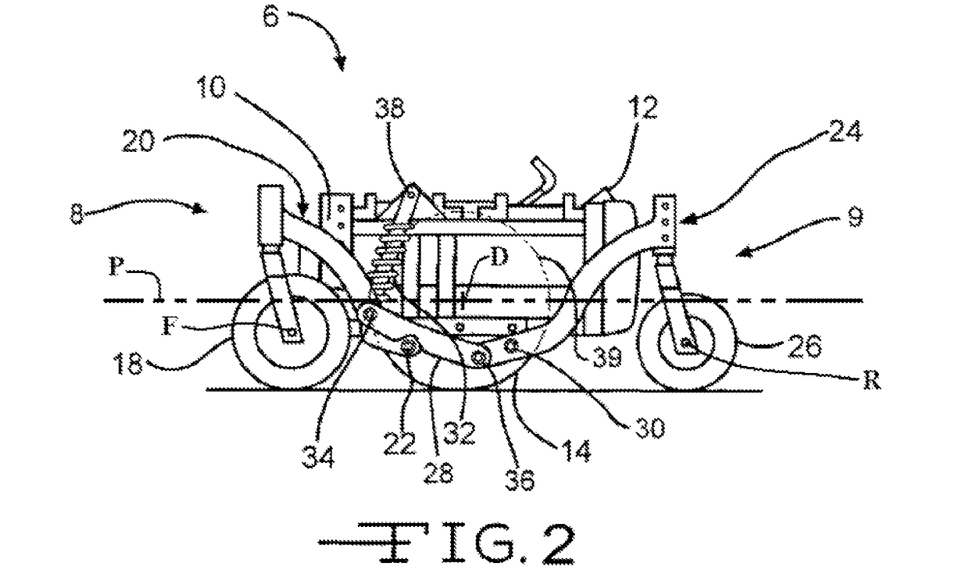
FIG. 2 is a side view in elevation of the base of the wheelchair of FIG. 1, with the one of the drive wheels removed for clarity.
Figure 3:
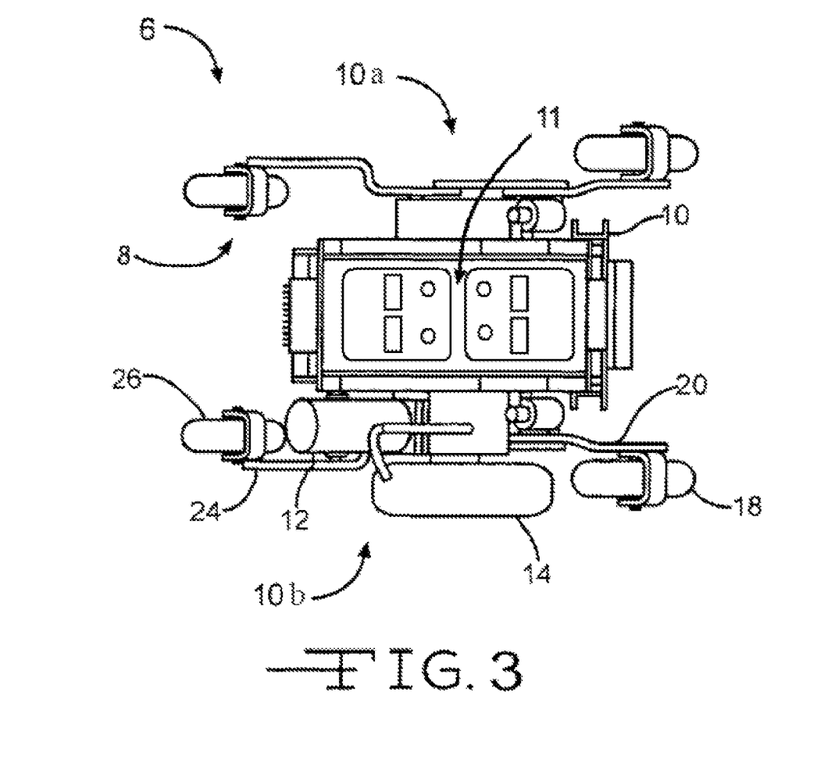
FIG. 3 is a plan view in elevation of the base of FIG. 2.

A center wheel drive power wheelchair 6 configured with a suspension 8 is shown in FIGS. 1-3. The wheelchair 6 includes a base 9 and a frame 10 supporting two center drive wheels 14 mounted for rotation and aligned along a horizontal axis, indicated at D, and normal to the direction of fore/aft motion, and two drives 12 for powering the center drive wheels 14. The frame 10 supports a seat 16 for the wheelchair occupant. As shown in FIG. 3, the frame 10 houses a battery 11 between a left frame side portion 10a and a right frame side portion 10b. On each side of the wheelchair a front pivot arm 20 is pivotally mounted to the frame 10 at a front pivot point 22. The front pivot arm 20 includes a front caster 18 to support the frame 10. On each side of the wheelchair a rear pivot arm 24 is pivotally mounted to the frame 10 at a rear pivot point 30 as shown in FIG. 2. As shown in FIGS. 2 and 3, the front and rear pivot arms 20, 24 may each be formed of vertically oriented plate members. As shown in FIG. 2, when the wheelchair is situated on level ground, both the front arm pivot point 22 and the rear arm pivot point 30 are positioned below a plane P passing through the drive wheel rotational axis, D. The rear pivot arm 24 includes a rear caster 26 to support the frame. The present embodiment of the center wheel drive power wheelchair, shown in FIGS. 1-6, includes front casters 18 and rear casters 26. However, it should be understood that the term "casters" includes casters, idler wheels and anti-tip wheels. The drive wheels 14 can be mounted from the frame 10 by means of pivot arms, not shown, but such pivot arms are optional.

As shown in FIGS. 2-6, each front pivot arm 20 includes a front link point or front linkage mount 34 located to the front of the front pivot point 22. The rear pivot arm 24 includes a rear link point or rear linkage mount 36 located to the front of the rear pivot point 30. It can be seen that when the front pivot arm 20 pivots upward relative to the frame 10 on the front pivot point 22, the front link point 34 moves up and the front caster 18 is raised. Likewise, when the rear pivot arm 24 pivots relative to the frame 10 on the rear pivot point 30, the rear link point 36 moves down and the rear caster is raised.

The center wheel drive power wheelchair suspension 8 includes a connecting linkage or link 28 which connects the front pivot arm 20 at the front link point 34 to the rear pivot arm 24 at the rear link point 36. Although the connecting linkage 28 shown in FIGS. 2-6 is a straight member, it should be understood that the connecting linkage 28 may be any means of connecting the front pivot arm 20 at the front link point 34 to the rear pivot arm 24 at the rear link point 36. The connecting linkage 28 is configured in such a way that an upward or downward rotation of one of the pivot arms 20 or 24 about its respective pivot point 22 or 30 causes rotation of the other pivot arm about its pivot point in an opposite rotational direction. Therefore, if the front caster 18 is raised up, the front pivot arm 20 will pivot clockwise, when viewing the left hand side of the wheelchair as shown in the drawings, about its pivot point 22. This will cause the corresponding movement of the rear pivot arm 24 in a counterclockwise rotational movement about its pivot point 30. Counterclockwise rotation of the rear pivot arm 24 causes the rear caster to be raised from the ground. In summary, the connecting linkage 28 connects the front and rear pivot arms 20, 24 to each other in a manner such that an upward or downward rotation of one of the pivot arms about its pivot point causes rotation of the other pivot arm about its pivot point in an opposite rotational direction. Another result of the suspension 8 is that when the front caster wheels 18 are lifted up, the rear caster wheels 26 are also lifted up. As shown in FIG. 2, when the wheelchair is situated on level ground, the front linkage mount 34, the rear linkage mount 36, and the link 28 are all positioned below the drive wheel rotational axis D.

Figure 16:
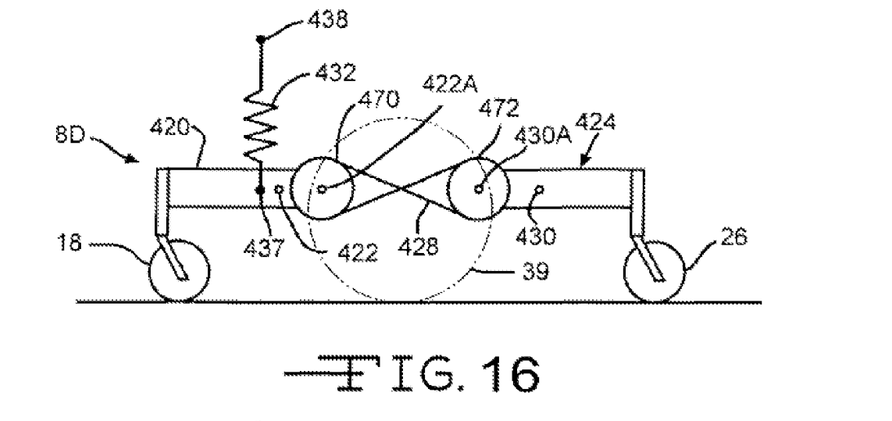
FIG. 16 is a side view in elevation of a rotating members configuration of the wheelchair suspension.

As shown in FIG. 2, the front caster wheel 18 defines a front caster rotational axis F, while the rear caster wheel 26 defines a rear caster rotational axis R. It can be seen that, in this illustrated embodiment, the front arm pivot point 22 is located closer to the front arm linkage mount 34 than it is to the front caster rotational axis F. This relationship is also shown in the embodiment of FIG. 16, where the front arm pivot point 422 is located closer to the front arm linkage mount 422A than it is to the front caster rotational axis, similar to rotational axis F of FIG. 2. As also shown in FIG. 16, each of the front and rear arm pivot points 422 and 430 is positioned between the respective casters 18 and 26 and linkage mounts 422A and 430A.

The front and rear pivot arms can be configured so that the ratio of the upward angular rotation of the front pivot arm to corresponding upward angular rotation of the rear pivot arm is approximately 1:1. In other embodiments, the ratio of angular rotation of the front pivot arm to corresponding angular rotation of the rear pivot arm is different from 1:1. For example, the ratio can be greater than 1:1 so that a 30 degree angular rotation of the front arm 20 results in a 20 degree angular rotation of the rear arm 24.

Figure 5:
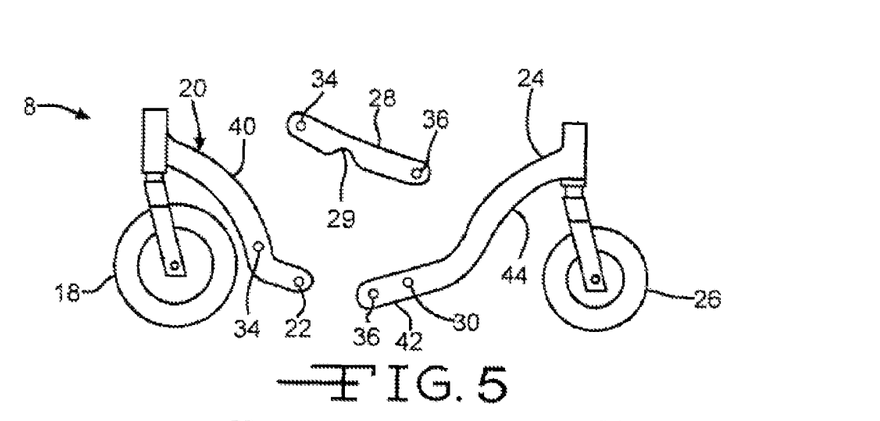
FIG. 5 is an exploded view in elevation of the suspension of the wheelchair.

The connecting linkage 28 can be provided with a notch 29 to conform to the structure of the pivot point apparatus at pivot point 22, as shown in FIG. 5. An optional feature of the suspension 8 is the use of a resilient member 32, as shown in FIG. 2, which is connected to hold or urge the suspension 8 in or to a desired position. In a specific embodiment of the invention, the resilient member is a spring 32 that connects the connecting linkage 28 and the front pivot arm 20, at the front link point 34, to the frame 10. The spring 32 urges the connecting linkage 28 and the front pivot arm 20 toward the frame 10, and hence provides a home position or neutral position for the suspension 8. As various members of the suspension 8 pivot, the spring 32 is stretched (or compressed), thereby biasing the suspension into a neutral position. One end of the spring 32 is connected to the connecting linkage 28 and the front pivot arm 20 at the front link point 34, which is forward of the front pivot point 22, and the other end to the frame 10 at the frame spring point 38. It can be seen that front link point 34 is positioned between the front caster 18 and the front arm pivot point 22. It will be appreciated that the linkage 28 in FIG. 2 allows the biasing force generated on the front arm 20 by the coil spring 32 to be transferred to the rear pivot arm 24. As shown, this is accomplished without a coil spring connected between the frame 10 and the rear pivot arm 24. This spring and pivot arm arrangement also applies to other embodiments, such as that shown in FIG. 16. The resilient member 32 provides resistance to movement of the linkage 28 and the front pivot arm 20 relative to the frame 10. It should be understood that the resilient member 32 may be any means of providing resistance or a biasing force to movement of the connecting linkage 28 and the front pivot arm 20 relative to the frame 10. The resilient member 32 need not be connected to the frame 10 at frame spring point 38, but can connect the connecting linkage 28 and the front pivot arm 20 to other members. Also, the spring can be connected solely to the connecting linkage or solely to the front pivot arm 20.

An exploded view of the center wheel drive power wheelchair suspension 8 is shown in FIG. 5. The front pivot arm 20 includes a front pivot arm forward segment 40 located forward of the front pivot point 22. The rear pivot arm 24 includes a rear pivot arm forward segment 42 located forward of the rear pivot point 30 and a rear pivot arm rearward segment 44 located rearward of the rear pivot point 30.

Figure 4:
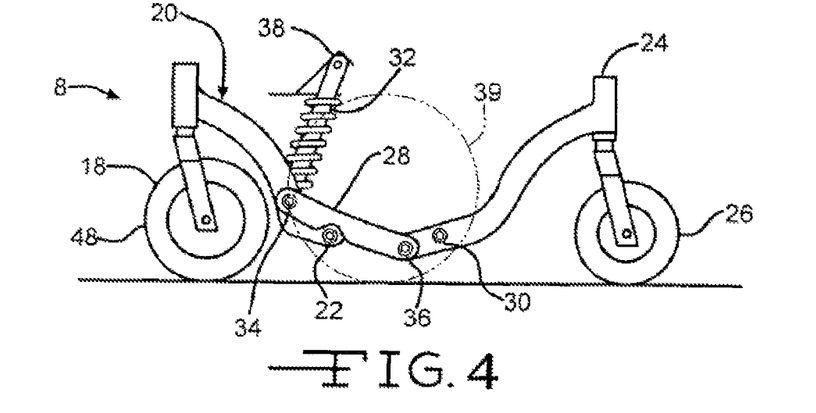
FIG. 4 is a side view in elevation of the suspension of the wheelchair.

As shown in FIG. 4, the front caster 18, the rear caster 26, and the center drive wheels 14 are normally all in constant contact with the ground. However, it should be appreciated that under normal conditions continuous contact with the ground by the front caster 18 and rear caster 26 is not required for the operation of this suspension system.

In an optional embodiment, the front pivot point 22 and the rear pivot point 30 are located within the outline or envelope 39 of the center drive wheel 14, as shown in FIG. 4, to allow the pivot points to be as close to the ground as possible. The envelope is the region corresponding to the outline of the drive wheel. In some instances, such as disclosed in FIG. 25, at least one of the front and rear pivot points is positioned within the envelope 39 during operation.

Figure 6:
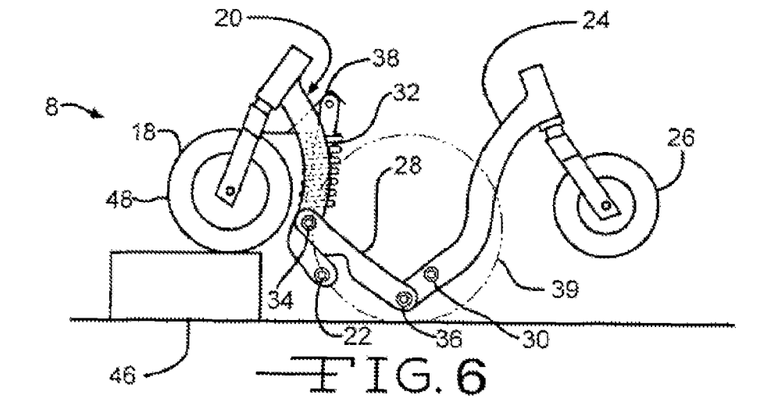
FIG. 6 is a side view in elevation of the suspension as the wheelchair is overcoming an obstacle.

Referring now to FIG. 6, the ability of the center wheel drive power wheelchair 6 to overcome an obstacle will now be described. As the center wheel drive power wheelchair 6 encounters an obstacle 46, the front caster 18 contacts the obstacle 46, and a force $F_{fc}$ is created on the leading edge 48 of the front caster due to the momentum of the wheelchair 6 in the forward direction. Force $F_{fc}$ causes an upward movement of the front caster 18. The upward movement of the front caster causes an upward rotation of the front pivot arm 20 about the front pivot point 22. As the front pivot arm 20 pivots about the front pivot point 22 (clockwise, as shown in FIG. 6), the front pivot arm 20 causes the front link point 34 to rotate in a clockwise direction. As the front link point 34 rotates in a clockwise direction, the connecting linkage 28 connected to the front pivot arm 20 at the front link point 34 also moves in a clockwise rotational direction. Rotational movement of the connecting linkage 28 is resisted by the resilient member 32. As the connecting linkage 28 moves in a clockwise direction, the rear link point 36 moves downward. As the connecting linkage 28 moves in a clockwise direction and the rear link point 36 moves downward, the connected rear pivot arm 24 is forced to rotate (counter-clockwise as shown in FIG. 6) about the rear pivot point 30. Counter-clockwise rotation of the rear pivot arm 24 about the rear pivot point 30 results in an upward rotation of the rear pivot arm rearward segment 44. The upward rotation of the rear pivot arm rearward segment 44 results in a lifting of the rear caster 26.

Summarizing the action of the center drive power wheelchair suspension 8, a force on either the front caster 18 or the rear caster 26, results in the lifting of that caster and a rotation of the respective pivot arm. The rotation of the pivot arm about its pivot point results in a movement of the connecting linkage 28, which connects the front pivot arm 20 and the rear pivot arm 24 to each other in a manner such that an upward or downward rotation of one of the pivot arms about its pivot point causes rotation of the other pivot arm about its pivot point in an opposite rotational direction. This action causes the front caster 18 and the rear caster 26 to lift, thereby causing the center drive wheels 14 to maintain contact with the ground. While FIG. 6 describes the ability of the center wheel drive power wheelchair 6 to overcome an obstacle 46 in the forward direction, the center wheel drive power wheelchair 6 has the ability to overcome an obstacle 46 in either the forward or rearward direction.

In the embodiment disclosed in FIGS. 1-6, the connecting linkage 28 is shown a straight member. However, the connecting linkage 28 can be configured in numerous other shapes. As will be explained below, examples of different configurations of the connecting linkage 28 include a cross-over beam, an elongated member, a gear linkage, rotatable members connected by a belt or chain, a cross-over beam with a third link, an electronic system, a hydraulic system, a pneumatic system, a curved member or any equivalent means.

It can be seen that when the wheelchair encounters rough terrain, where the drive wheel 14 travels over a depression or low spot, the raising of the front and rear wheels 18, 26 will maintain the drive wheels 14 in contact with the ground. It also can be seen that the front caster 18 and the rear caster 26, as well as their respective pivot arms 20 and 24, are independent of the drive wheels 14 and any suspension for the drive wheels.

Figure 7:
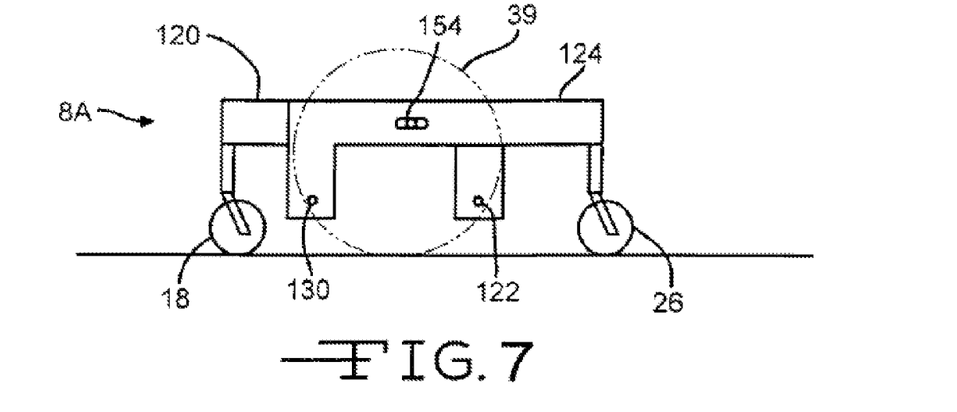
FIG. 7 is a side view in elevation of a cross-over beam configuration of the wheelchair suspension.
Figure 8:
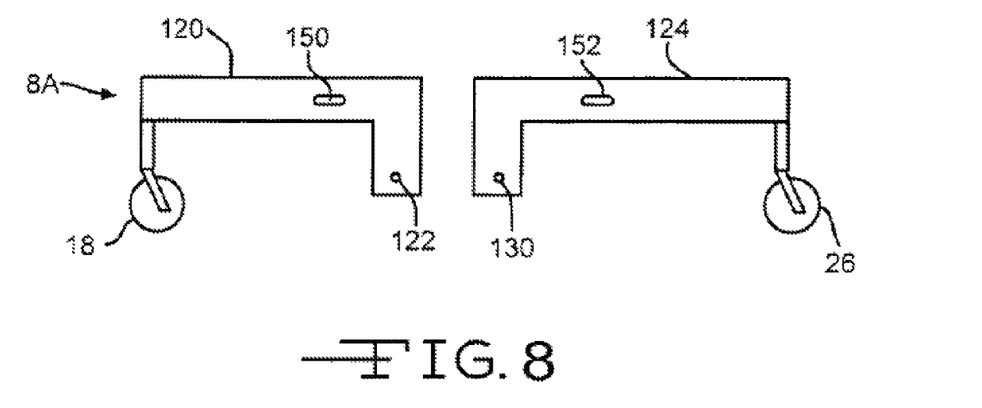
FIG. 8 is an exploded view in elevation of the suspension of FIG. 7.
Figure 9:
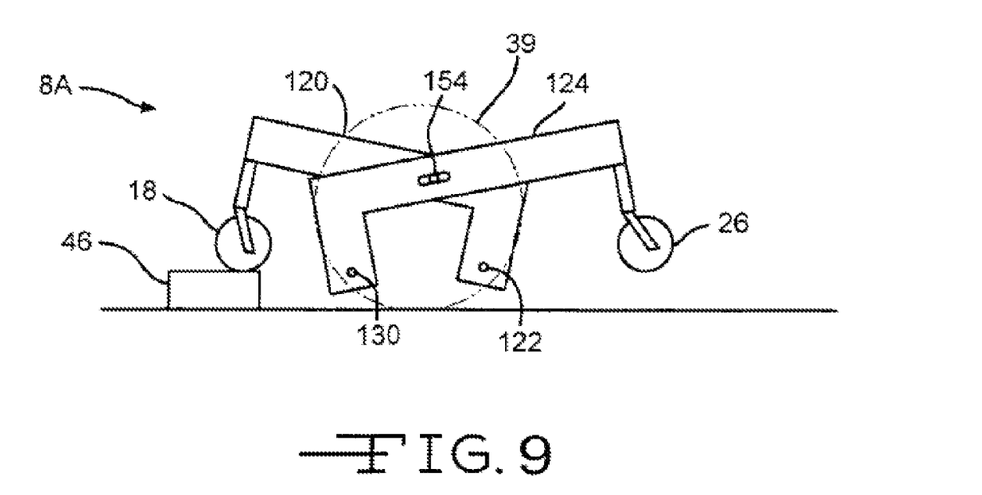
FIG. 9 is a side view in elevation of the suspension of the claim 7 as the wheelchair is overcoming an obstacle.

In another embodiment of the center wheel drive power wheelchair suspension, as shown in FIGS. 7-9, a suspension 8A is configured in the form of a cross-over beam linkage. In this embodiment, the suspension 8A includes a front cross-over beam 120, which contains a first pin slot 150, and which pivots about a front pivot point 122. The suspension 8A also includes a rear cross-over beam 124, which contains a second pin slot 152, and which pivots about a rear pivot point 130. The front cross-over beam 120 and the rear cross-over beam 124 are connected to each other by a connecting pin 154 that extends into the first pin slot 150 and the second pin slot 152. The connection of the front cross-over beam 120 and the rear cross-over beam 124 by the connecting pin 154 is configured in such a way that an upward or downward rotation of one of the cross-over beams 120 or 124 about its respective pivot point 122 or 130 causes rotation of the other cross-over beam about its pivot point in an opposite rotational direction. Therefore, if the front caster 18 is raised up, such as by an impact with the obstacle 46, the front cross-over beam 120 will pivot in a clockwise direction, when viewing the left hand side of the wheelchair as shown in the drawings, about its pivot point 122. This will cause a corresponding movement of the rear cross-over beam 124 in a counterclockwise rotational movement about its pivot point 130. Counterclockwise rotation of the rear cross-over beam 124 causes the rear caster 26 to be raised from the ground. The pin 154 can be any mechanism suitable to connect the slots 150, 152 together to allow the beams 120 and 124, respectively, to be connected in a pivotable manner. For ease of description, similar part numbers will be used in describing similar parts in the various embodiments.

Figure 10:
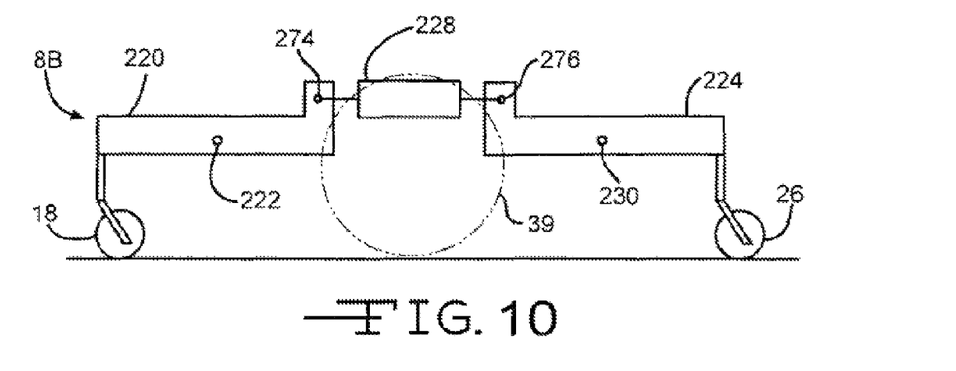
FIG. 10 is a side view in elevation of an electronic configuration of the wheelchair suspension.
Figure 11:
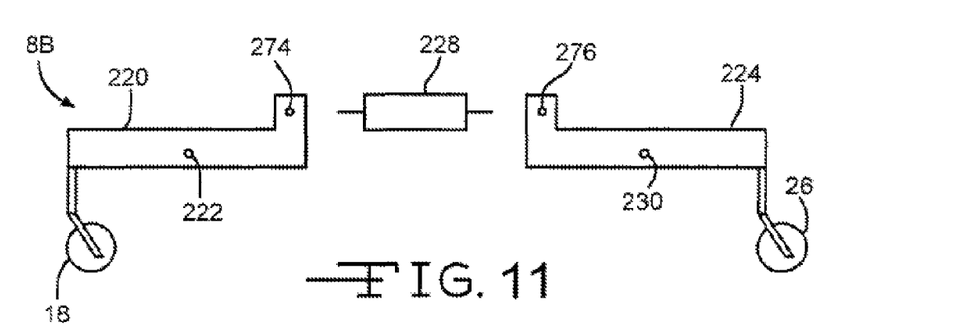
FIG. 11 is an exploded view in elevation of the suspension of FIG. 10.
Figure 12:
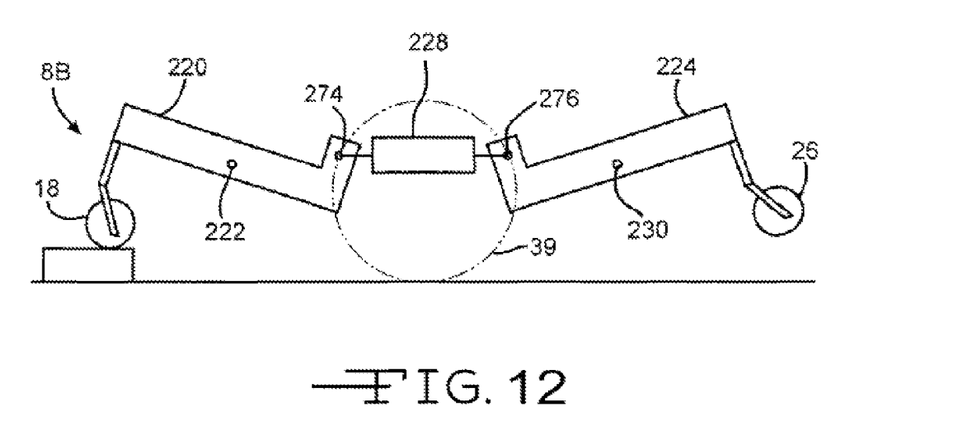
FIG. 12 is a side view in elevation of the suspension of the claim 10 as the wheelchair is overcoming an obstacle.

In another embodiment of the center wheel drive power wheelchair suspension, as shown in FIGS. 10-12, a suspension 8B has an electronic linkage configuration. In this embodiment, the suspension 8B includes a front pivot arm 220 that is mounted for pivoting relative to the frame 10 about front pivot point 222. The front pivot arm 220 includes a connection point 274. The suspension 8B also includes a rear pivot arm 224 mounted for pivoting relative to the frame 10 about a rear pivot point 230. The rear pivot arm 224 contains a rear connection point 276. The front pivot arm 220 and the rear pivot arm 224 are connected to each other by an electronic linkage 228 at the front connection point 274 and the rear connection point 276, respectively. The electronic linkage 228 is configured to sense the upward or downward rotation of one of the pivot arms 220 or 224 about its respective pivot point 222 or 230 and subsequently to cause rotation of the other pivot arm about its pivot point in an opposite rotational direction. Therefore, if the front caster 18 is raised up, such as by encountering an obstacle 46, the front pivot arm 220 will pivot in a clockwise direction. Such rotation is sensed by the electronic linkage 228, about its pivot point 222 and the electronic linkage 228 will cause the corresponding movement of the rear pivot arm 224 in a counterclockwise rotational movement about its pivot point 230. Counterclockwise rotation of the rear pivot arm 224 causes the rear caster 26 to be raised from the ground. The electronic linkage can be a mechanism that senses the rearward or downward movement of connection point 274, or forward or downward motion of the connection point 276. The electronic linkage 228 can be freely suspended between the arm 220 and the arm 224. Alternatively, it can be connected to the frame 10 in any suitable manner. The connection between the arms 220, 224 and the electronic linkage can be purely electronic, in which case an inclinometer or other similar device can be incorporated into the system to communicate the presence of a pivoting motion for one of the arms 220, 224.

Other mechanisms can be used for sensing the motion or rotation of one of the arms 220 and 224, and causing the other of the arms to pivot. Although the linkage 228 shown in FIGS. 10-12 has been described as an electronic linkage, it should be understood that the linkage 228 may be any means of sensing rotational movement of rotational movement of one of the pivot arms 220 or 224 and to subsequently cause rotation of the other pivot arm 220 or 224 including a hydraulic system or a pneumatic system. For example, the system could include solenoids activated by pivoting of one of the arms 220, 224, with the other arm provided with a counter-rotating pivoting motion by the action of a motor. Optionally, the electronic linkage 228 includes a resilient member, not shown, to hold or urge the suspension 8B in or to a desired position. Also, the electronic linkage 228 itself can act as a resilient member to hold or urge the suspension 8B in or to a desired position. It should be understood that a separate resilient member, comprising any means of holding or urging the suspension 8B in or to a desired position, may be used.

Figure 13:
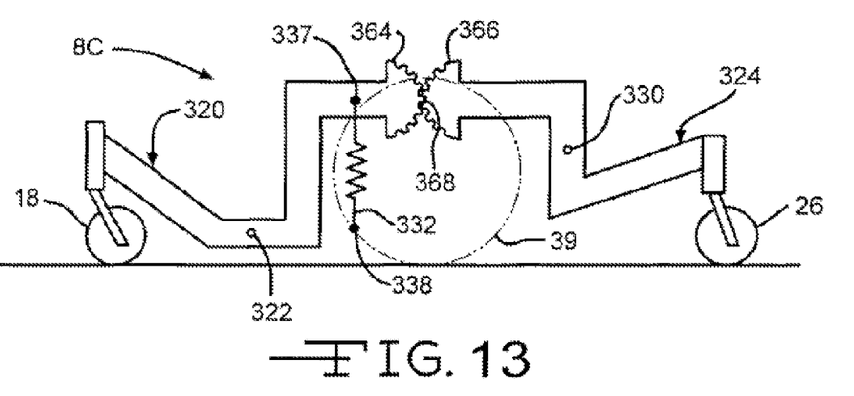
FIG. 13 is a side view in elevation of a gear linkage configuration of the wheelchair suspension.
Figure 14:
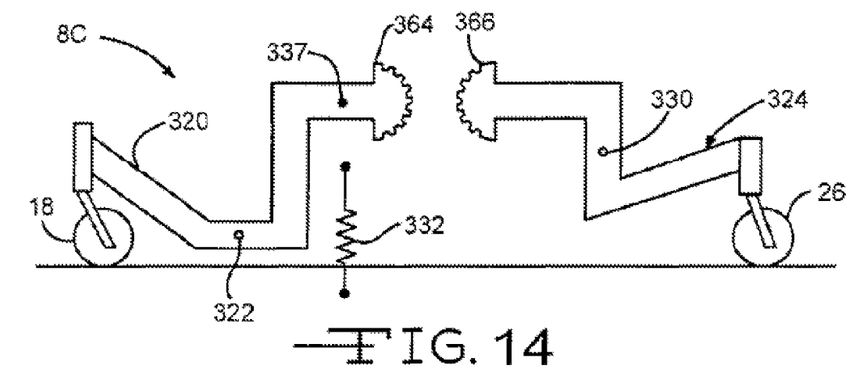
FIG. 14 is an exploded view in elevation of the suspension of FIG. 13.
Figure 15:
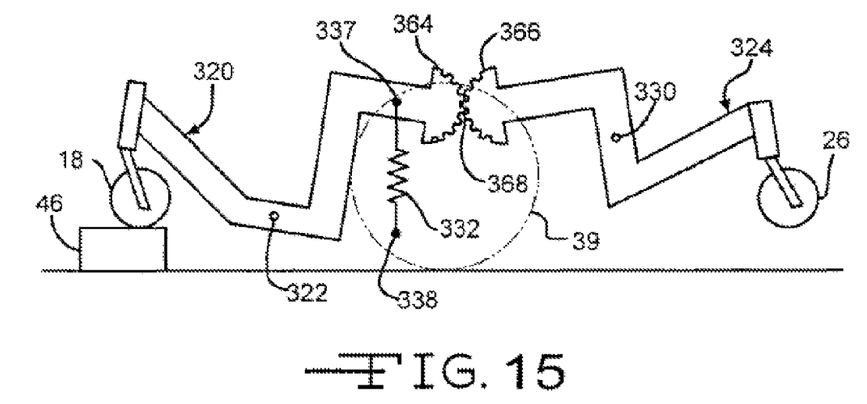
FIG. 15 is a side view in elevation of the suspension of the claim 13 as the wheelchair is overcoming an obstacle.

In another embodiment of the center wheel drive power wheelchair suspension, as shown in FIGS. 13-15, a suspension 8C includes a gear linkage. In this embodiment, the suspension 8C includes a front pivot arm 320 which contains a front gear rack 364, and which pivots about a front pivot point 322. The suspension 8C also includes a rear pivot arm 324 containing a rear gear rack 366, which pivots about the rear pivot point 330. The front pivot arm 320 and the rear pivot arm 324 are connected to each other as the front gear rack 364 engages the rear gear rack 366 at the gear rack intersection 368. The connection of the front gear rack 364 and the rear gear rack 366 at the gear rack intersection is configured in such a way that an upward or downward rotation of one of the pivot arms 320 or 324 about its respective pivot point 322 or 330 causes rotation of the other pivot arm about its pivot point in an opposite rotational direction. Therefore, if the front caster 18 is raised up, such as by encountering an obstacle 46, the front pivot arm 320 will pivot in a clockwise direction, when viewing the left hand side of the wheelchair as shown in the drawings, about its pivot point 322. This will cause the corresponding movement of the rear pivot arm 324 in a counterclockwise rotational movement about its pivot point 330. Counterclockwise rotation of the rear pivot arm 324 causes the rear caster 26 to be raised from the ground. An optional feature of the suspension 8C is the use of a resilient member 332, which is connected to the front pivot arm 320 at the spring point 337 and to the frame 10 at the frame spring point 338. The resilient member 332 is configured to hold or urge the suspension 8C in or to a desired or neutral position. Although the resilient member 332 shown in FIGS. 13-15 is a spring, it should be understood that the resilient member 332 may be any means of holding or urging the suspension 8C in or to a desired position. It is to be understood that the gear mechanism with gear racks 364, 366 can be any mechanism suitable for causing rotation or pivoting of one of the arms 320, 324 in response to the pivoting of the other arm.

Figure 17:
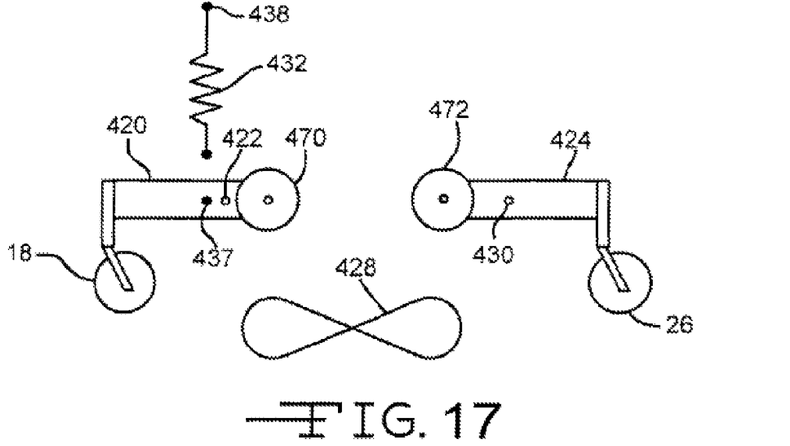
FIG. 17 is an exploded view in elevation of the suspension of FIG. 16.
Figure 18:
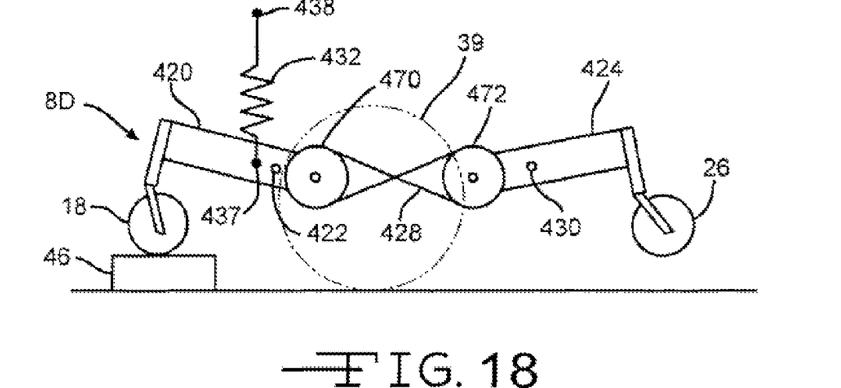
FIG. 18 is a side view in elevation of the suspension of the claim 16 as the wheelchair is overcoming an obstacle.

As shown in FIGS. 16-18, a suspension 8D for the center wheel drive power wheelchair can be configured with belts, chains or other power transmission members to tie together the rotation or pivoting of the suspension members. In this embodiment, the suspension 8D includes a front pivot arm 420, which contains or is connected to a front pulley 470. The front pivot arm is pivotally mounted at front pivot point 422 for pivoting with respect to the frame. The suspension 8D also includes a rear pivot arm 424 containing a rear pulley 472. The rear pivot arm 424 is mounted for pivoting with respect to the frame 10 about the rear pivot point 430. The front pivot arm 420 and the rear pivot arm 424 are connected to each other by a belt 428 that engages the front pulley 470 and the rear pulley 472. The connection of the front pulley 470 and the rear pulley 472 by the belt 428 is configured in such a way that an upward or downward rotation of one of the pivot arms 420 or 424 about its respective pivot point 422 or 430 causes rotation of the other pivot arm about its pivot point in an opposite rotational direction. Therefore, if the front caster 18 is raised up, such as would occur if an obstacle 46 is encountered, the front pivot arm 420 will pivot in a clockwise direction, when viewing the left hand side of the wheelchair as shown in the drawings, about its pivot point 422 and cause the corresponding movement of the rear pivot arm 424 in a counterclockwise rotational movement about its pivot point 430. Counterclockwise rotation of the rear pivot arm 424 causes the rear caster 26 to be raised from the ground. While the suspension 8D is shown configured with the belt 428 to connect the front pulley 470 with the rear pulley 472, it should be understood that any transmission means, such as a chain or cord, can be used to transmit rotation from the pulleys 470 and 472 to each other.

An optional feature of the suspension 8D is the use of a resilient member 432 which is connected between the suspension 8D and the frame 10. A resilient member, such as a spring 432, connects the front pivot arm 420 at the spring point 437 and to the frame 10 at the frame spring point 438. The spring 432 is configured to hold or urge the suspension 8D in or to a desired position. It should be understood that the spring 432 may be any means, such as an elastic member or elastic band, capable of holding or urging the suspension 8D in or to a desired position.

Although the suspension 8D shown in FIGS. 16-18 illustrates the pivot arms 420 and 424 as pivoting on pivot points 422 and 430 respectively, the arms could alternatively be set up as pivoting at pivot points 422A and 430A, which are positioned at the center of the pulleys 470, 472.

Figure 19:
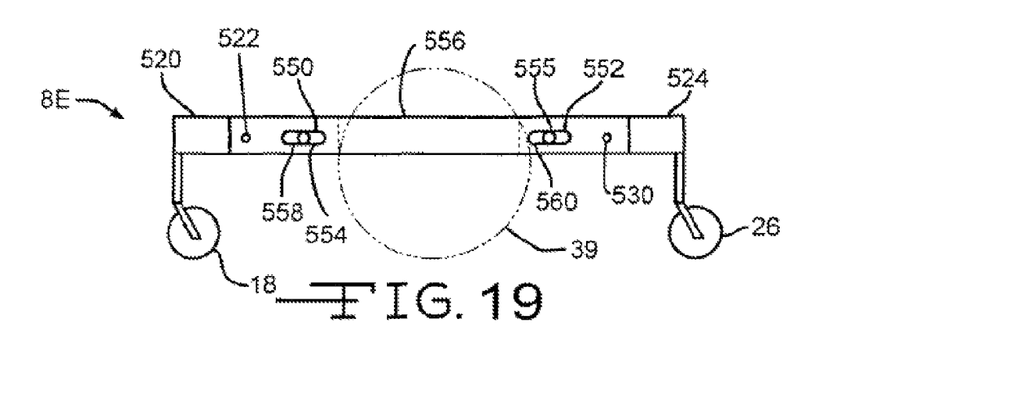
FIG. 19 is a side view in elevation of an elongated link configuration of the wheelchair suspension.
Figure 20:
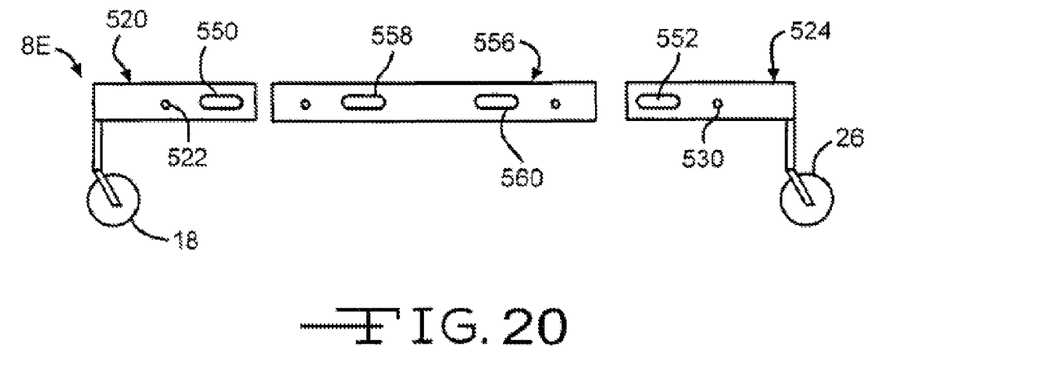
FIG. 20 is an exploded view in elevation of the suspension of FIG. 19.
Figure 21:
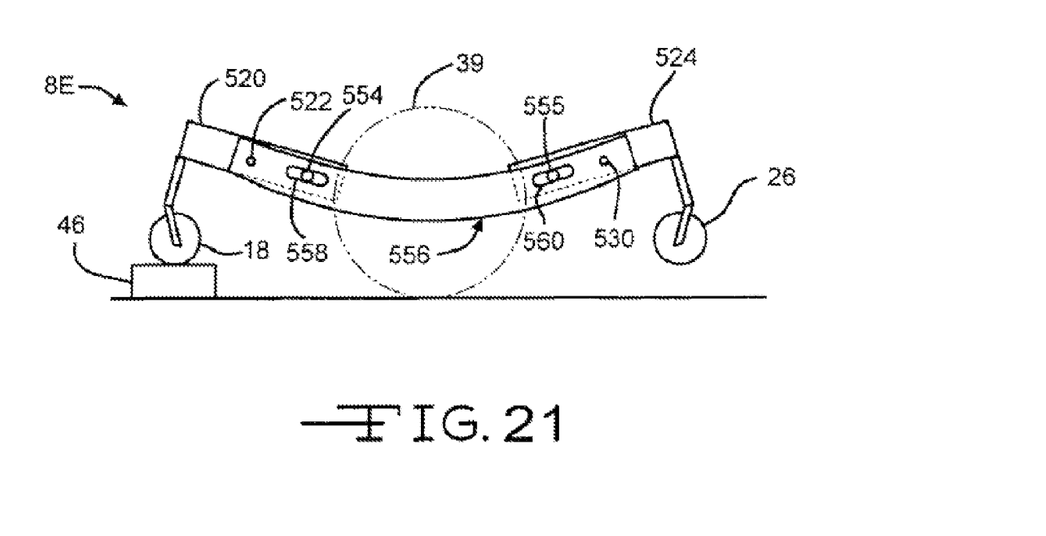
FIG. 21 is a side view in elevation of the suspension of the claim 19 as the wheelchair is overcoming an obstacle.

In another suspension of the center wheel drive power wheelchair, as shown in FIGS. 19-21, the suspension 8E includes a linkage in the form of an elongated member. In this embodiment, the suspension 8B includes a front pivot arm 520 which contains a first pin slot 550. The front pivot arm 520 pivots about a front pivot point 522. The suspension 8E also includes a rear pivot arm 524 which contains a second pin slot 552, and which pivots about a rear pivot pin 530. The front pivot arm 520 and the rear pivot arm 524 are connected to each other by an elongated member 556. The elongated member 556 is rotatably mounted at the front pivot point 522 and the rear pivot point 530. The elongated member 556 is also connected to the front pivot arm 520 by a first link pin 554 which extends through the first pin slot 550 in the front pivot arm 520, and through the front slot 558 in the elongated member 556. Similarly, the elongated member 556 is connected to the rear pivot arm 524 by a second link pin 555 which extends through the second pin slot 552 in the rear pivot arm 524, and through the rear slot 560 in the elongated member 556.

The elongated member 556 is a flexible member. The connection of the elongated member 556 to the front pivot arm 520 and to the rear pivot arm 524 by the link pins 554 and 555 is configured in such a way that an upward or downward rotation of one of the pivot arms 520 or 524 about its respective pivot point 522 or 530 causes a movement or displacement of the elongated member 556 that in turn causes a rotation of the other pivot arm about its pivot point in an opposite rotational direction. The movement or displacement of the elongated member 556 can be a bending due to the torque or bending forces applied by the upward movement of the front arm 520 or rear arm 224. Therefore, if the front caster 18 is raised up, such as shown in FIG. 21 where the wheelchair 6 has encountered an obstacle 46, the front pivot arm 520 will pivot in a clockwise direction, when viewing the left hand side of the wheelchair as shown in the drawings, about its pivot point 522. This causes a downward flexing or rotation of the elongated member and causes the corresponding movement of the rear pivot arm 524 in a counterclockwise rotational movement about its pivot point 530. Counterclockwise rotation of the rear pivot arm 524 causes the rear caster 26 to be raised from the ground. In this embodiment of the invention, the elongated member 556 connects the front pivot arm 520 and the rear pivot arm 524 as well as acts as a resilient member in the suspension 8E by resisting motion and returning the system to a neutral position as it flexes.

Figure 22:
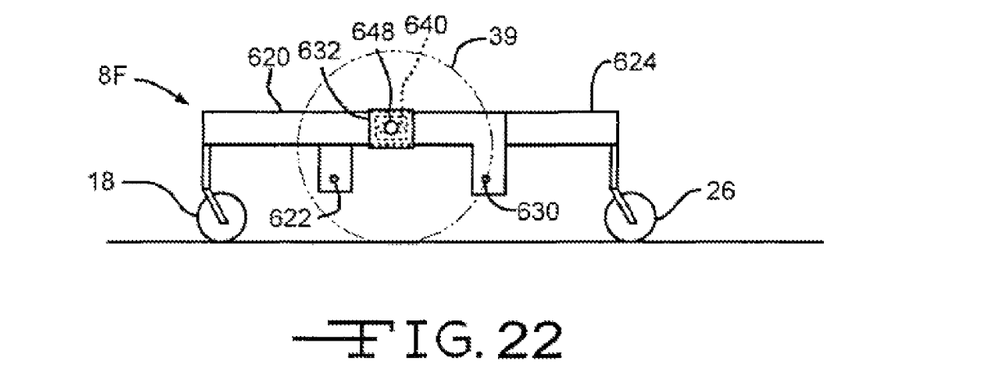
FIG. 22 is a side view in elevation of a third link configuration of the wheelchair suspension.
Figure 23:
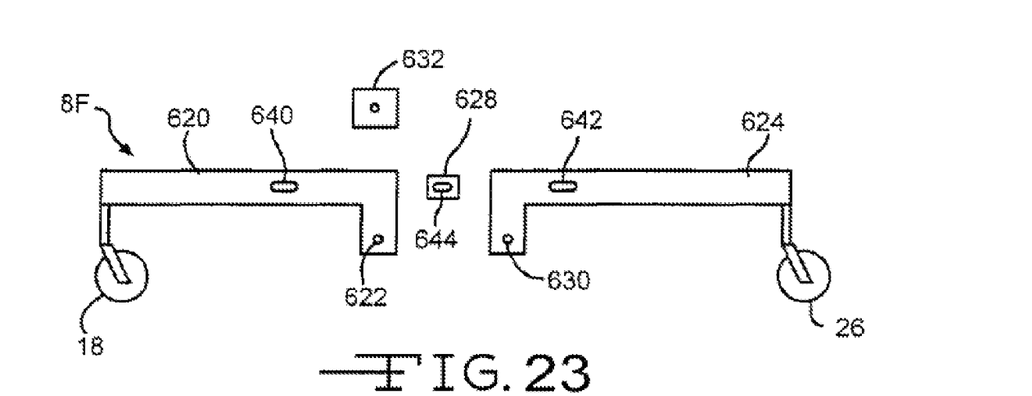
FIG. 23 is an exploded view in elevation of the suspension of FIG. 22.
Figure 24:
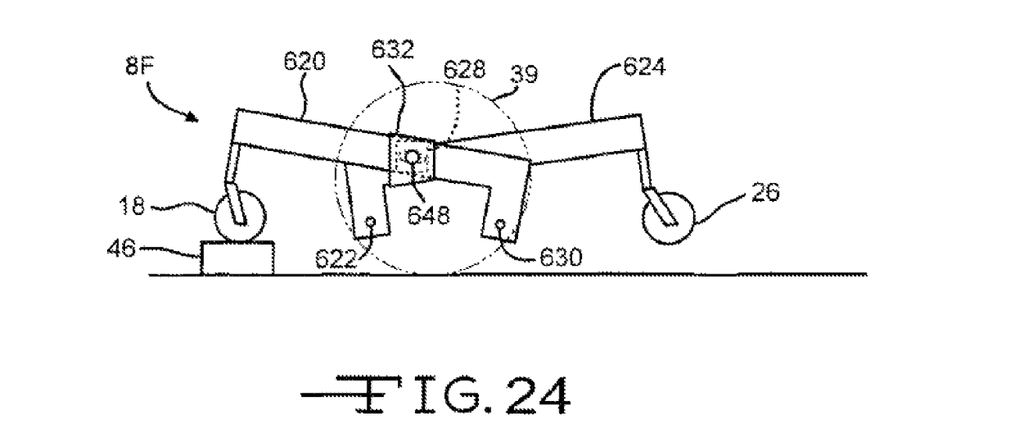
FIG. 24 is a side view in elevation of the suspension of the claim 22 as the wheelchair is overcoming an obstacle.

As shown in FIGS. 22-24 a center wheel drive power wheelchair suspension 8F includes a cross-over beam linkage with a resilient connection and an optional third link. In this embodiment, the suspension 8F includes a front cross-over beam 620 which pivots about a front pivot point 622. The suspension 8F also includes a rear cross-over beam 624 which pivots about a rear pivot point 630. The front cross-over beam 620 and the rear cross-over beam 624 are optionally connected to each other by a third link 628. The front crossover beam 620 includes an elongated slot 640, and the rear crossover beam includes a corresponding elongated slot 642. The third link 28 also includes an elongated slot 644. When the front cross-over beam 620 and the rear cross-over beam 624 are assembled with the third link 628, the elongated slots 640, 642 and 644 are all aligned and held in a connected configuration by a linking pin 648.

The connection of the front cross-over beam 620 and the rear cross-over beam 624 by the third link 628 is configured in such a way that an upward or downward rotation of one of the cross-over beams 620 or 624 about its respective pivot point 622 or 630 causes rotation of the other cross-over beam about its pivot point in an opposite rotational direction. Therefore, if the front caster 18 is raised up, as would be the case upon impact with an obstacle 46, the front cross-over beam 620 will pivot in a clockwise direction, when viewing the left hand side of the wheelchair as shown in the drawings, about its pivot point 622 and cause the corresponding movement of the rear cross-over beam 624 in a counterclockwise rotational movement about its pivot point 630. Counterclockwise rotation of the rear cross-over beam 624 causes the rear caster 26 to be raised from the ground.

In an alternate configuration of the suspension 8F, a resilient member, such as an elastic band 632, can be positioned around the front and rear cross over beams 620, 624, to hold them together and urge them into a neutral position. When the elastic band or other resilient member is employed, the optional third link is not necessary.

Figure 25:
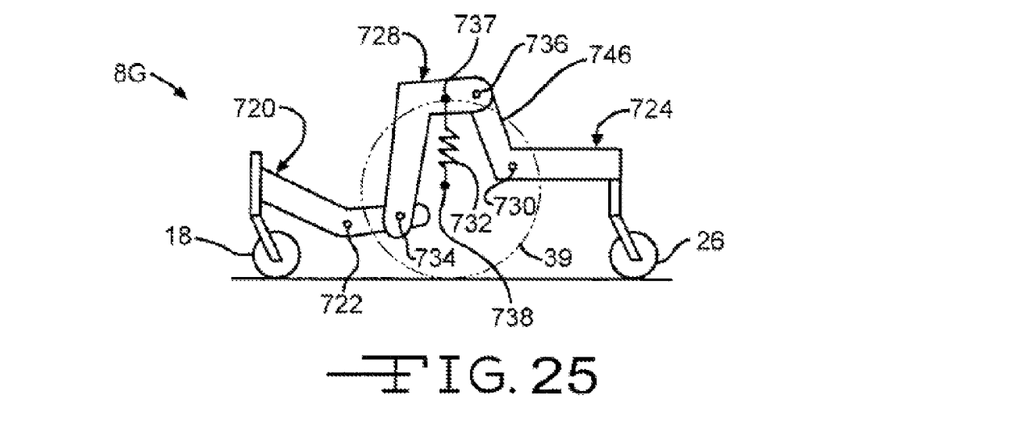
FIG. 25 is a side view in elevation of an angled link configuration of the wheelchair suspension.
Figure 26:
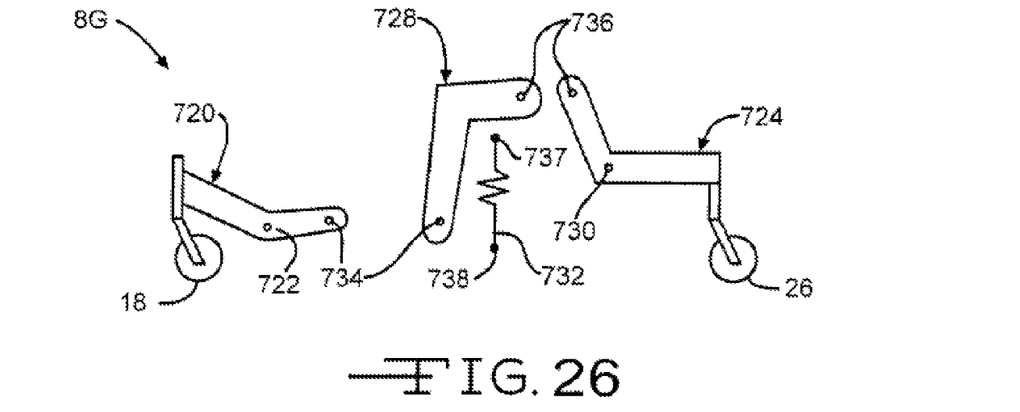
FIG. 26 is an exploded view in elevation of the suspension of FIG. 25.
Figure 27:
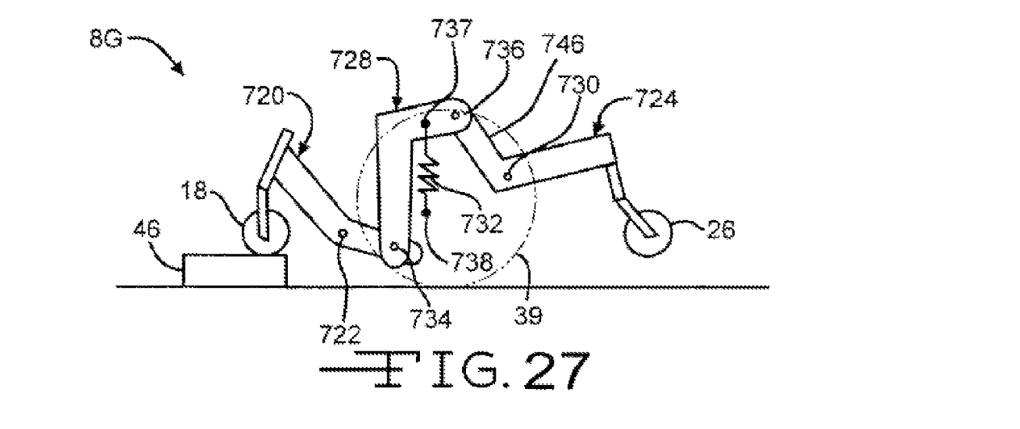
FIG. 27 is a side view in elevation of the suspension of the claim 25 as the wheelchair is overcoming an obstacle.

In yet another suspension configuration, as shown in FIGS. 25-27, the suspension 8G includes a curved member linkage. In this configuration the suspension 8G includes a front pivot arm 720 which contains a front link point 734, with the front pivot arm 720 being configured to pivot about a front pivot point 722. The suspension 8G also includes a rear pivot arm 724 containing a rear link leg 746. The rear pivot arm is mounted to pivot about the rear pivot point 730. The front pivot arm 720 and the rear pivot arm 724 are connected to each other by a connecting linkage 728. The connecting linkage 728 connects to the front pivot arm 720 at the front link point 734 and to the rear pivot arm 724 at the rear link leg 746. The connection of the front pivot arm 720, the rear pivot arm 724 and the connecting linkage 728 is configured in such a way that an upward or downward rotation of one of the pivot arms 720 or 724 about its respective pivot point 722 or 730 causes rotation of the other pivot arm about its pivot point in an opposite rotational direction. Therefore, if the front caster 18 is raised up, the front pivot arm 720 will pivot in a clockwise direction, when viewing the left hand side of the wheelchair as shown in the drawings, about its pivot point 722. This will cause the corresponding movement of the rear pivot arm 724 in a counterclockwise rotational movement about its pivot point 730. Counterclockwise rotation of the rear pivot arm 724 causes the rear caster 26 to be raised from the ground.

As shown, the connecting linkage 724 is a curved member. However, the connecting member 724 can be of any shape or form that connects the front pivot arm 720 to the rear pivot arm 724 and can transmit rotational movement of one pivot arm to an opposite rotational movement in the other pivot arm. An optional feature of the suspension 8G is the use of a resilient member 732, which is connected at one end to the front pivot arm 720 at the spring point 738, and at the other end to the frame 10. In this embodiment, the resilient member 732 is a spring which is configured to hold or urge the suspension 8 in or to a desired position, but it should be understood that the resilient member 732 can be any means to hold or urge the suspension 8G in or to a desired position.

While the various suspension configurations above illustrate only the left side of the suspension, it is to be understood that the suspension actually includes both a left and a right suspension. Also, an optional feature of any of the suspensions described above is the use of a resilient member configured to hold or urge the suspension in or to a desired position. The resilient member can be a spring, an elastic band, or any means of holding or urging the suspension 8 in or to a desired position.

It is to be understood that the term "caster" includes idler wheels as well as casters. Also, the mid-wheel drive wheel, which is usually positioned underneath the approximate center of gravity of the wheelchair and occupant, can be positioned anywhere between the front caster 18 and the rear caster 26. Further, although the suspension systems disclosed are configured so that when the front pivot arm 20 is raised the rear pivot arm 24 is also raised, the suspension 8 can be configured in an opposite manner, wherein when the front arm 20 is raised, the rear pivot arm is lowered relative to the frame. Also, the suspension 8 can be configured so that the rear pivot arms can be disconnected and therefore not mounted for pivoting in response to the pivoting of the front pivot arm. In yet another configuration, the connecting linkage 28 is configured in an adjustable manner so that adjustments in the suspension 8 can be readily made. The adjustment feature can include a telescoping configuration, an angle change configuration, or any other configuration that allows adjustability. Also, although the suspension 8 has been described in terms of a front pivot arm 20 with front caster 18, a rear pivot arm 24 with rear caster 26, and a drive wheel, typical use on a wheelchair will include such a suspension on each side of the wheelchair (left and right), so that there is a pair of front pivot arms 20 with front casters 18, a pair of rear pivot arms 24 with rear caster 26, and a pair of drive wheels.

The principle and mode of operation of this invention have been described in its preferred embodiments. However, it should be noted that this invention may be practiced otherwise than as specifically illustrated and described without departing from its scope.

What is claimed is:

1. An electronically controlled midwheel drive wheelchair comprising:
    a chair;
    a frame for supporting the chair, the frame housing a battery between left and right frame side portions, with each frame side portion having a front arm frame mount fixed to the frame, a rear arm frame mount fixed to the frame, and a spring frame mount;
    left and right drive wheels located along the respective frame side portions for supporting the frame and the chair, each drive wheel connected to a separate motor drive unit for propelling the wheelchair along a selected path; and
    left and right linkage/suspension assemblies located along the respective frame side portions, each linkage/suspension assembly including:
        a front arm defining a front arm pivot point and a front arm linkage mount, the front arm provided with a front caster defining a front caster rotational axis, the front arm pivot point connected to the front arm frame mount so as to pivotally attach the front arm to the respective frame side portion;
        a rear arm defining a rear arm pivot point and a rear arm linkage mount, the rear arm provided with a rear caster for helping support the frame, the rear arm pivot point connected to the rear arm frame mount so as to pivotally attach the rear arm to the respective frame side portion;
        a linkage coupling the front and rear arms together at the front and rear arm linkage mounts, the linkage operative such that rotation of one of the front or rear arms about its pivot point in one direction relative to the frame translates via the linkage to rotation of the other one of the front and rear arms about its pivot point in an opposite rotational direction relative to the frame; and
        a spring having one end connected to the spring frame mount and an opposite end connected to one of the front and rear pivot arms at a spring mounting point located between the respective caster and the respective frame pivot point, the spring being operative to generate a biasing force on the one arm, and wherein the linkage is operative to transfer the biasing force from the one arm to the other arm such that the spring is operative to affect movement of both the front and rear arms as the respective casters encounter surface irregularities during travel.

2. The wheelchair according to claim 1 wherein the drive wheel defines a drive wheel rotational axis and wherein, for each linkage/suspension assembly, both the front and rear arm pivot points are positioned below the drive wheel rotational axis.

3. The wheelchair according to claim 1 wherein the drive wheel defines a drive wheel rotational axis and wherein, for each linkage/suspension assembly, both the front and rear arm linkage mounts, and the linkage, are positioned below the drive wheel rotational axis.

4. The wheelchair according to claim 1 wherein an outer region of the drive wheel defines an envelope, and wherein at least one of the front and rear arm pivot points is positioned substantially within the envelope.

5. The wheelchair according to claim 4 wherein both of the front and rear pivot points are positioned substantially within the envelope.

6. The wheelchair according to claim 1 wherein at least one of the front and rear arms is formed of a vertically oriented plate.

7. The wheelchair according to claim 1 wherein, when the front caster encounters a raised obstacle during travel, a forward end of the front arm moves upwardly and the front arm rotates relative to the respective side frame in one direction, and the rear arm rotates relative to the respective side frame in the opposite direction.

8. The wheelchair according to claim 7 wherein, when the rear arm rotates relative to the respective side frame in the opposite direction, a rearward end of the rear arm moves upwardly to lift the rear caster off the ground.

9. The wheelchair according to claim 1 wherein each drive wheel defines a drive wheel rotational axis, and the drive wheel is directly mounted on its respective frame side portion such that the drive wheel rotational axis is fixed relative to the frame.

10. The wheelchair according to claim 1 wherein one of the front or rear arm linkage mounts is positioned between the respective caster and the respective arm pivot point, and wherein the linkage includes a link having ends pivotally connected to the front and rear arm linkage mounts.

11. The wheelchair according to claim 1 wherein the front and rear pivot points are each positioned between the respective caster and the respective arm linkage mount.

12. The wheelchair according to claim 1 wherein the linkage includes a slot and pin arrangement.

13. The wheelchair according to claim 1 wherein the linkage includes a flexible member.

14. An electronically controlled midwheel drive wheelchair comprising:
    a chair;
    a frame for supporting the chair, the frame housing a battery between left and right frame side portions, with each frame side portion having a front arm frame mount fixed to the frame, a rear arm frame mount fixed to the frame, and a spring frame mount;

left and right drive wheels located along the respective frame side portions for supporting the frame and the chair, each drive wheel connected to a separate motor drive unit for propelling the wheelchair along a selected path; and left and right linkage/suspension assemblies located along the respective frame side portions, each linkage/suspension assembly including:

a front arm defining a front arm pivot point and a front arm linkage mount, the front arm provided with a front caster defining a front caster rotational axis, the front arm pivot point connected to the front arm frame mount so as to pivotally attach the front arm to the respective frame side portion, and wherein the front arm pivot point is located closer to the front arm linkage mount than it is to the front caster rotational axis;

a rear arm defining a rear arm pivot point and a rear arm linkage mount, the rear arm provided with a rear caster for helping support the frame, the rear arm pivot point connected to the rear arm frame mount so as to pivotally attach the rear arm to the respective frame side portion;

a linkage coupling the front and rear arms together at the front and rear arm linkage mounts, the linkage operative such that rotation of one of the front or rear arms about its pivot point in one direction relative to the frame translates via the linkage to rotation of the other one of the front and rear arms about its pivot point in an opposite rotational direction relative to the frame; and a spring having one end connected to the spring frame mount and an opposite end connected to one of the front and rear pivot arms at a spring mounting point located between the respective caster and the respective frame pivot point, the spring being operative to generate a biasing force on the one arm, wherein the linkage is operative to transfer the biasing force from the one arm to the other arm such that the spring is operative to affect movement of both the front and rear arms as the respective casters encounter surface irregularities during travel.

15. An electronically controlled midwheel drive wheelchair comprising:

a chair;

a frame for supporting the chair, the frame housing a battery between left and right frame side portions, with each frame side portion having a front arm frame mount fixed to the frame, a rear arm frame mount fixed to the frame, and a spring frame mount;

left and right drive wheels located along the respective frame side portions for supporting the frame and the chair, each drive wheel defining a drive wheel rotational axis and connected to a separate motor drive unit for propelling the wheelchair along a selected path; and left and right linkage/suspension assemblies located along the respective frame side portions, each linkage/suspension assembly including:

a front arm defining a front arm pivot point and a front arm linkage mount, the front arm provided with a front caster defining a front caster rotational axis, the front arm pivot point connected to the front arm frame mount so as to pivotally attach the front arm to the respective frame side portion, and wherein both the front arm pivot point and the front arm linkage mount are positioned below the drive wheel rotational axis;

a rear arm defining a rear arm pivot point and a rear arm linkage mount, the rear arm provided with a rear caster for helping support the frame, the rear arm pivot point connected to the rear arm frame mount so as to pivotally attach the rear arm to the respective frame side portion, and wherein both the rear arm pivot point and the rear arm linkage mount are positioned below the drive wheel rotational axis;

wherein an outer region of the drive wheel defines an envelope, and wherein at least one of the front and rear arm pivot points is positioned substantially within the envelope during the operation of the wheelchair;

a linkage coupling the front and rear arms together at the front and rear arm linkage mounts, the linkage positioned below the drive wheel rotational axis and operative such that rotation of one of the front or rear arms about its pivot point in one direction relative to the frame translates via the linkage to rotation of the other one of the front and rear arms about its pivot point in an opposite rotational direction relative to the frame; and a coil spring having one end connected to the spring frame mount and an opposite end connected to one of the front and rear pivot arms at a spring mounting point located between the respective caster and the respective frame pivot point, the spring being operative to generate a biasing force on the one arm, wherein the linkage is operative to transfer the biasing force from the one arm to the other arm such that the spring is operative to affect movement of both the front and rear arms as the respective casters encounter surface irregularities during travel.

* * * * *